United States Patent [19]

Stephens et al.

[11] Patent Number: 4,482,409
[45] Date of Patent: Nov. 13, 1984

[54] PLASTICIZER SYSTEM FOR PROPELLANT COMPOSITIONS

[75] Inventors: William D. Stephens, Huntsville, Ala.; Brenda K. Rodman, Catlett, Va.

[73] Assignee: The United States of America as represented by the Secretary of the Air Force, Washington, D.C.

[21] Appl. No.: 497,457

[22] Filed: May 23, 1983

[51] Int. Cl.³ .............................................. C06B 45/10
[52] U.S. Cl. .................................. 149/19.4; 149/19.9; 560/263
[58] Field of Search .................... 149/19.1, 19.9, 19.4; 560/263

[56] References Cited

U.S. PATENT DOCUMENTS

| | | | |
|---|---|---|---|
| 2,096,451 | 10/1937 | Parodi-Delfino | 560/263 |
| 2,962,419 | 11/1960 | Minich | 560/263 |
| 2,991,297 | 7/1961 | Cooley et al. | 560/263 |
| 3,282,971 | 11/1966 | Metro et al. | 560/263 |
| 3,939,201 | 2/1976 | Bacskai | 560/263 |

*Primary Examiner*—Edward A. Miller
*Attorney, Agent, or Firm*—Donald J. Singer; William J. O'Brien

[57] ABSTRACT

This invention discloses the synthesis of a dilinoleate ester plasticizer and its use as a plasticizer for propellant compositions.

1 Claim, No Drawings

PLASTICIZER SYSTEM FOR PROPELLANT COMPOSITIONS

STATEMENT OF GOVERNMENT INTEREST

The invention described herein may be manufactured and used by or for the Government for governmental purposes without the payment of any royalty thereon.

BACKGROUND OF THE INVENTION

This invention relates to solid propellant compositions and to an improved internal plasticizer system for use therewith. In a more particular aspect, this invention concerns itself with a novel branch-chained, unsaturated ester having a particular molecular structure and to its use as an internal plasticizer for isocyanate-cured propellant compositions.

The increased interest and utilization of solid propellant compositions has spawned a considerable research effort in an attempt to improve their ballistic and physical properties. Generaly, solid propellants are composed of one or more organic or inorganic oxidizers dispersed in a resinous binder matrix which may also function as a fuel. Typical oxidizers are ammonium perchlorate or HMX (cyclotetramethylene tetranitramine), both of which are well known in the art. Various resinous components, such as hydracarbons, polyesters, polyurethanes and other like materials may serve as a binder/fuel matrix. A supplemental fuel component, such as finely powered aluminum, may be used also. Other additive components, such as anti-oxidants, burning rate modifiers, wetting agents, anti-foaming agents and plasticizers may be added to the propellant composition, if desired. Dibutylphthalate, dioctyl adipate, or triacetin are often employed as inert plasticizers in combination with the resinous binder material.

Plasticizers are used in rocket propellants for a number of reasons. These include processing assistance by incorporation of fluid materials in the propellant mix, the improvement of low temperature flexibility and the improvement of mechanical properties and ballistic characteristics. In using solid propellants, however, a problem exists in the use of plasticizers because of the tendency of plasticizer molecules to migrate or evaporate from a propellant composition in storage. Either of these processes results in chemical changes in the composition which are harmful to the propellant and to other inert parts of the rocket motor. Also, on long term storage, changes in mechanical properties of the propellant often occur, particularly near the liner-propellant bond. Other negative effects which are associated with the use of plasticizers, include crystallization at low temperatures, a tendency to soften the propellant excessively at high temperatures, and the fact that the plasticizer may migrate into the liner from the uncured propellant much more rapidly than it does from a cured propellant system. Consequently, a continuing research effort has been conducted in an attempt to solve the migration problem associated with propellant plasticizers, and to provide a plasticizer that does not migrate rapidly even in an uncured propellant.

One research effort involved the use of a material known as ZL-496. This material, ZL-496, is a polybutadiene with a molecular weight of approximately 3,000. The use of ZL-496, as a plasticizer, was contemplated because of its molecular size. It is quite large and it was believed that its polymer chain entanglement would prevent migration. Unfortunately, however, it was found that even plasticizer molecules as large as ZL-496 have a tendency to migrate out of the propellant composition and shorten the shelf life of a rocket motor.

In furthering the above research effort, however, it was unexpectedly discovered that a branch-chained, unsaturated ester having a particular molecular structure could be utilized as a plasticizer in the fabrication of solid propellants. This novel plasticizer replaces the conventional plasticizers generally utilized in composite propellants, especially those having a binder base which utilizes an isocyanate cure reaction for its curing system. The resulting propellant exhibits a minimum amount of plasticizer migration during normal storage and exhibits a very good shelf-life.

SUMMARY OF THE INVENTION

In accordance with this invention, there is provided a novel compound which acts effectively as a plasticizer for propellant compositions without the attendant problems of plasticizer migration which often arise during propellant storage. The plasticizer of this invention is a linoleate ester having a particular molecular structure as illustrated by the following structure formula.

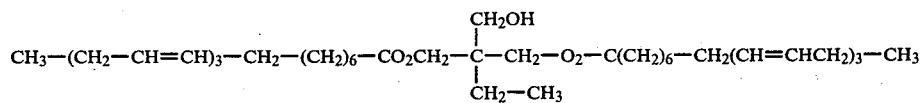

$$CH_3-(CH_2-CH=CH)_3-CH_2-(CH_2)_6-CO_2CH_2-\underset{\underset{CH_2-CH_3}{|}}{\overset{\overset{CH_2OH}{|}}{C}}-CH_2-O_2-C(CH_2)_6-CH_2(CH=CHCH_2)_3-CH_3 \quad (I)$$

This plasticizer is used in the propellant in a binder/plasticizer ratio ranging from about 75 to 95 parts by weight of binder to 5 to 25 parts by weight of plasticizer.

Accordingly, the primary object of this invention is to provide a novel lineolate ester plasticizer having a particular molecular structure.

Another object of this invention is to provide a novel solid propellant composition that produces only minimum amounts of plasticizer migration during its shelf-life.

Still another object of this invention is to provide a novel linoleate ester that finds particular utility as an internal plasticizers for solid propellant compositions.

The above and still other objects and advantages of the present invention will become more readily apparent upon consideration of the following detailed description thereof.

DESCRIPTION OF THE PREFERRED EMBODIMENTS

With the above-mentioned and other objects in mind, the present invention contemplates the synthesis of a novel lineoleate ester plasticizer and its utilization as an internal plasticizer in a conventional composite solid propellant.

The novel plasticizer contemplated by the present invention is a branch-chained, unsaturated, lineoleate ester having the following structural formula.

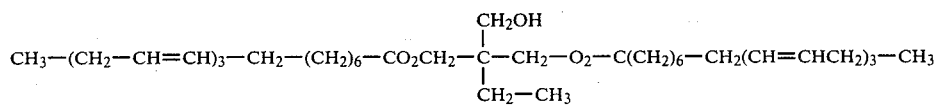

It is believed that the particular molecular structure illustrated in Formula (I) above provides a particular advantage for the use of this ester as an internal plasticizer. The plasticizer links to the binder network of the propellant and, therefor, is unable to migrate or evaporate away from the propellant during storage. This provides the propellant with an excellent shelf-life.

The synthesis of the plasticizer of this invention is accomplished by effecting a reaction between an equimolar mixture of linolenoyl chloride and trimethyl propane. This reaction is illustrated by the following reaction scheme.

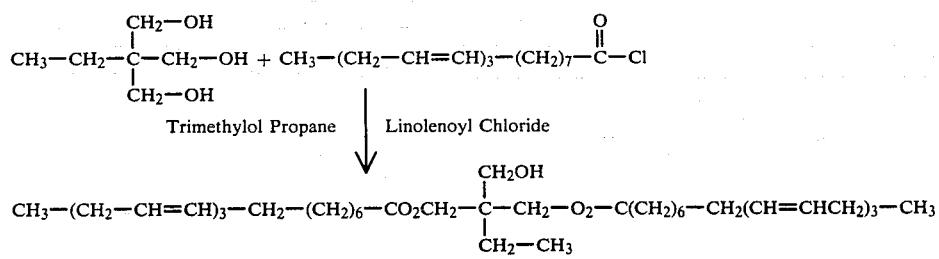

Example 1, which follows, discloses the experimental details of the reaction and method of synthesis illustrated by equation (II).

EXAMPLE I

Trimethylolpropane Dilinoleate 308.02 grams (2.30 moles) of trimethylol propane (MW-134 g/mole) were dissolved in benzene and dried by refluxing and draining the azeotrope. The dry solution was added to 3 liters of diglyme dried with sodium ribbon. The solution was warmed with stirring in a 12 liter flask to 180° F. 682 grams (2.30 moles) of linolenoyl chloride (MW-296.45 g) was added dropwise over a period of three hours. The mixture was stirred overnight at 180° F. An additional 682 grams (2.30 moles) of linolenoyl chloride was added over a period of three hours and again heated at 180° F. overnight. After cooling, an excess of sodium carbonate in a water slurry was added to the reaction mixture to remove the hydrogen chloride. The mixture was then filtered. Approximately 250 ml of hexane were added to approximately 500 ml batches of the product, placed in a separatory funnel of appropriate size and washed three times with 200 ml of deionized water to remove any unreacted TMP and acid along with the diglyme and sodium carbonate. The hexane was removed by rotary evaporation, and the product was stored over molecular sieves.

An illustration showing the use of the novel internal plasticizer of this invention in a solid propellant is shown in Table I. Although ammonium perchlorate and the isocyanate-cured polybutadiane binder are preferred, other conventional oxidizing and resinous binders may be utilized, if desired, as well as other conventional propellant components.

Solid propellant compositions are well known and since the basic preparation and constituent ingredients of the propellant compositions of this invention are not significantly altered or critical to the execution of the invention, with the exception of the internal plasticizer component, a detailed explanation of the propellant's preparation is not deemed necessary. The plasticizers of this invention are pre-reacted with the isocyanate curing agent, and then incorporated into the propellant mix in a conventional manner at any stage prior to cure. Generally, all of the ingredients are homogenously mixed in a conventional blender. After mixing, the uncured propellant mix is then placed in an oven and cured at a temperature and for a period of time sufficient to produce a firm, rubbery, solid propellant. The resulting propellant differs from a conventional propellant composition only in the essential replacement of a conventional plasticizer with the novel internal plasticizer of this invention.

TABLE I 68.0 parts by weight of ammonium perchlorate.
7.45 parts by weight of hydroxy-terminated polybutadiene (R-45M)
22.0 parts by weight of aluminum powder fuel
0.25 parts by weight of a curing agent, isophorone diisocyanate (IPDI)
2.0 parts by weight of the internal plasticizer of this invention which was first prereacted with IPDI
0.30 parts by weight of a bonding agent, HX-752
0.075 parts by weight of a delayed quick-cure catalyst (equal parts MgO, Triphenyl Bismuth, and Maleic Anhydride).

The above ingredients were thoroughly mixed in a conventional mixer. After an homogenous mixture had been obtained, the uncured propellant was then placed in an oven at 170° F. for 7 days. After 7 days, a firm, rubbery, solid propellant was obtained.

Tables II, III and IV, which follow, illustrate a propellant composition using dioctyl adipate (DOA) as an internal plasticizer; a propellant with no plasticizer; and a propellant with the internal plasticizer of this invention.

TABLE II

| FORMULATION OF DOA ANALOG PLASTICIZED PROPELLANT | |
|---|---|
| INGREDIENT | PARTS BY WEIGHT OF MIX |
| DOA | 2.0 |
| MAGNESIUM OXIDE | 0.025 |
| ALUMINUM | 22.0 |
| AP 200 | 51.0 |
| AP 6900 | 17.0 |
| MALEIC ANHYDRIDE | 0.025 |
| TRIPHENYL BISMUTH | 0.025 |

TABLE II-continued

FORMULATION OF DOA ANALOG PLASTICIZED PROPELLANT

| INGREDIENT | PARTS BY WEIGHT OF MIX |
|---|---|
| R45M BINDER | 8.0 |

TABLE III

FORMULATION OF ANALOG SPACE PROPELLANT

| Ingredient | Parts by Weight of Mix |
|---|---|
| TEPANOL | 0.15 |
| Magnesium Oxide | 0.025 |
| H-30 Aluminum | 21.0 |
| AP 200 | 48.3 |
| AP 6900 | 20.7 |
| Octadecyl Isocyanate | 0.04 |
| Maleic Anhydride | 0.025 |
| Triphenyl Bismuth | 0.025 |
| R-45M MAO-111 Binder | 9.81 |
| IPDI | |

TABLE IV

FORMULATION OF PROPELLANT PLASTICIZED WITH PROPELLANT OF THIS INVENTION

| Ingredient | Parts by Weight of Mix |
|---|---|
| HX-752 | 0.3 |
| Internal Plasticizer Prereacted with IPDI | 2.0 |
| Magnesium Oxide | 0.025 |
| Aluminum | 22.0 |
| AP 200 | 51.0 |
| AP 6900 | 17.0 |
| Maleic Anhydride | 0.025 |
| Triphenyl Bismuth | 0.025 |
| R-45M MAO-III Binder | 7.7 |
| IPDI | |

Tables V, VI, VII, which follow, disclose the physical properties of the propellants of Tables II, III and IV, respectively. Table VIII discloses the mechanical properties of one gallon test mixes of the propellant of Table IV using the plasticizer of this invention.

TABLE V

PHYSICAL PROPERTIES OF DOA PLASTICIZED PROPELLANTS

| Mix No. | Cure Ratio | Maximum Stress (psi) | Strain Maximum Stress (%) |
|---|---|---|---|
| 118 | .77 | 134 | 22 |
| 117 | .80 | 134 | 15 |
| 119 | .83 | 210 | 9.1 |

TABLE VI

PHYSICAL PROPERTIES OF UNPLASTICIZED SPACE PROPELLANT

| Mix No. | Cure Ratio | Maximum Stress (psi) | Strain Maximum Stress (%) |
|---|---|---|---|
| 129 | .79 | 116 | 32 |
| 128 | .82 | 181 | 31 |
| 127 | .85 | 198 | 32 |
| 120 | .88 | 223 | 7.2 |
| 121 | .91 | 243 | 5.7 |

TABLE VII

PHYSICAL PROPERTIES OF PROPELLANT PLASTICIZED WITH PLASTICIZER OF THIS INVENTION

| Mix No. | Cure Ratio | Maximum Stress (psi) | Strain Maximum Stress (%) |
|---|---|---|---|
| 255 | 0.64 | 230 | 20 |
| 253 | 0.70 | 210 | 22 |
| 254 | 0.76 | 263 | 21 |

TABLE VIII

MECHANICAL PROPERTIES OF 1-GALLON TEST MIXES

| Cure Ratio | Test Temp. | Stress (psi) | Strain (%) Max/Rupture | Modulus (psi) | Shore A |
|---|---|---|---|---|---|
| 0.61 | −65° F. | 1000 | 6.1/6.4 | 31,400 | |
| | Amb. | 107 | 23/30 | 755 | 56 |
| | 165° F. | 4R | 24/28 | 328 | |
| 0.67 | −65° F. | 1030 | 4.9/5.1 | 39,100 | |
| | Amb. | 165 | 18/23 | 1,400 | 67 |
| | 165° F. | 80 | 17/19 | 685 | |
| 0.73 | −65° F. | 1030 | 4.5/4.5 | 41,300 | |
| | Amb. | 201 | 15/15 | 2,020 | 73 |
| | 165° F. | 118 | 13/13 | 1,200 | |
| 0.79 | −65° F. | 1020 | 3.6/3.1 | 45,000 | |
| | Amb. | 259 | 10/10 | 3,210 | 78 |
| | 165° F. | 151 | 9.4/9.4 | 1,970 | |

While the present invention has been described by reference to particular embodiments, it should be understood by those skilled in the art that all the modifications that are embodied within the scope of the appended claims are intended to be included herein.

What is claimed is:

1. A solid propellant composition comprising a cured homogenous mixture of:
   A. a solid, particulate, oxidizer component;
   B. a synthetic resinous, polyisocyanate cured, polybutadiene binder component; and
   C. a lineoleate ester plasticizer having the following structural formula:

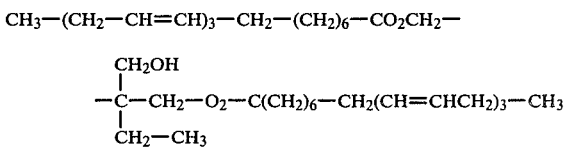

* * * *